US009209563B2

(12) United States Patent
Toratani et al.

(10) Patent No.: US 9,209,563 B2
(45) Date of Patent: Dec. 8, 2015

(54) POWER SUPPLY CONNECTOR AND METHOD FOR UNLOCKING POWER SUPPLY CONNECTOR

(71) Applicants: FURUKAWA ELECTRIC CO., LTD., Chiyoda-ku, Tokyo (JP); NISSAN MOTOR CO., LTD., Yokohama-shi, Kanagawa (JP)

(72) Inventors: Tomoaki Toratani, Tokyo (JP); Naomi Takahashi, Tokyo (JP); Kenichi Nakagawa, Kanagawa (JP)

(73) Assignees: FURUKAWA ELECTRIC CO., LTD., Tokyo (JP); NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/700,061

(22) Filed: Apr. 29, 2015

(65) Prior Publication Data

US 2015/0249305 A1 Sep. 3, 2015

Related U.S. Application Data

(63) Continuation of application No. PCT/JP2013/079112, filed on Oct. 28, 2013.

(30) Foreign Application Priority Data

Oct. 31, 2012 (JP) ................................. 2012-240341

(51) Int. Cl.
*H01R 13/627* (2006.01)
*H01R 13/629* (2006.01)
*H01R 13/639* (2006.01)
*H01R 13/641* (2006.01)
*B60L 11/18* (2006.01)

(52) U.S. Cl.
CPC ...... *H01R 13/62933* (2013.01); *B60L 11/1818* (2013.01); *H01R 13/639* (2013.01); *H01R 13/641* (2013.01)

(58) Field of Classification Search
CPC .. H01R 13/639; H01R 13/6272; H01R 13/62; H01R 13/641
USPC .......... 439/345, 350–352, 157, 310–311, 372
See application file for complete search history.

(56) References Cited

U.S. PATENT DOCUMENTS

| 5,350,312 | A | 9/1994 | Kuno et al. | |
| 8,439,699 | B2 * | 5/2013 | Ohmura | 439/372 |
| 8,758,039 | B2 * | 6/2014 | Ishida et al. | 439/372 |
| 2002/0177348 | A1 * | 11/2002 | Karamatsu et al. | 439/352 |

FOREIGN PATENT DOCUMENTS

| JP | 6-188044 A | 7/1994 |
| JP | 2011-165609 A | 8/2011 |
| JP | 2012-243687 A | 12/2012 |

OTHER PUBLICATIONS

International Search Report for PCT/JP2013/079112 mailed Jan. 28, 2014.

* cited by examiner

*Primary Examiner* — Edwin A. Leon
(74) *Attorney, Agent, or Firm* — Hauptman Ham, LLP

(57) ABSTRACT

According to the present invention, the pin, which is provided on the link member that links the lock lever and the electromagnetic solenoid, can be removed from both sides of the power supply connector. Thus, the pin can be removed from the side that allows workspace, regardless of the side on which the openable lid of the power reception connector is positioned. Thus, even when the electromagnetic solenoid malfunctions, the pin can be extracted with certainty, and the lock can be released. Thus, the power supply connector can be pulled out from the power reception connector. Further, because a cover is provided on the grasping member, the pin extraction workability is also excellent.

6 Claims, 15 Drawing Sheets

POWER SUPPLY CONNECTOR AND METHOD FOR UNLOCKING POWER SUPPLY CONNECTOR

RELATED APPLICATIONS

The present application is a continuation of International Application Number PCT/JP2013/079112, filed Oct. 28, 2013, which claims priority from Japanese Application Number 2012-240341, filed Oct. 31, 2012, the disclosures of which applications are hereby incorporated by reference herein in their entirety.

TECHNICAL FIELD

The present invention is used in electric automobiles and relates to a power supply connector for charging electricity.

BACKGROUND ART

In recent years, from the view point of global environmental issues, electric automobiles that do not use fossil fuels are attracting attention. Electric automobiles are equipped with a battery for driving, and run on electricity charged in the battery.

For charging electric automobiles, there are methods of charging from regular domestic power sources and methods of rapid charging using special charging equipments. In either method, when charging, a power supply connector that matches the onboard power reception connector becomes necessary. Such connectors are designed for electric automobiles with ease of use and safety in consideration, and generally have different forms from connectors conventionally used for power lines.

As a power supply connector for such electric automobiles, for example, a power supply connector, which comprises a case, a connector body that is slidably mounted to this case and accommodates multiple terminals, a pipe-shaped handle that is slidably mounted along the same axis with the connector body, and a lever, wherein the handle moves forward with the rotation of the lever, and fits the connector body to the connector body of the power reception side, is known (Patent Document 1).

RELATED ART

Patent Documents

Patent Document 1: JP-A-H06-188044

SUMMARY

On the other hand, in such a connector for charging electric automobiles, a lock mechanism is provided to prevent the power supply connector and the power reception connector from being pulled out during electric conduction. Without such lock mechanism, the power supply connector can be pulled out from the power reception connector during electric conduction, and is not favorable.

FIGS. 15(a) and (b) are schematic figures of a conventional power supply connector 100. As shown in FIG. 15(a), the power supply connector 100 is composed of a grasping member 103, a case 109, a connector body 111, etc. The connector body 111 is provided at the tip of the grasping member 103. The grasping member 103 and the connector body 111 are slidable with respect to the case 109. The connector connection process is performed by pressing the connector body 111 against a power reception connector, which is abbreviated in the figure, while the operator holds the handle 105.

A concaved part 119 is formed on the case 109. Further, on the grasping member 103, a lock lever 107 is rotatably fixed with a pin 113. One end of the lock lever 107 is exposed from the rear side of the grasping member 103, and can be operated by the operator. Further, a lock pin 107a is formed on the other end of the lock lever 107. In a normal state, the lock pin 107a is not invaginated into the concaved part 119 and the rear end of the lock lever 107 is in a state of being pressed downward.

As shown in FIG. 15(b), when the connector body 111 is pushed into the power reception connector (in the direction of arrow X in the figure) from this state, the grasping member 103 moves with respect to the case 109. Thus, the connector body 111 protrudes from the front of the case 109, and connects with the connector on the power reception side. Note that in this case, the case 109 is fixed to the connector of the power reception side by a lock mechanism that is abbreviated from the figure.

Here, by the relative movement of the case 109, the lock pin 107a moves to the position of the concaved part 119. For this reason, the lock lever 107 rotates with the pin 113 serving as the radix point (in the direction of arrow Y in the figure), and the lock pin 107a fits into the concaved part 119.

The electromagnetic solenoid 115, which is fixed to the grasping member 103, is operated in this state (in the direction of arrow Z in the figure). This leads the protrusion of the lock lever 107 to come in contact with the plunger of the electromagnetic solenoid 115, and the rotation of the lock lever 107 is regulated. Hence, a state in which the lock pin 107a is pressed against the concaved part 119 is maintained. In this state, because the case is fixed to the power reception connector side by the aforementioned lock mechanism (abbreviated from the figure), the connector body 111 can be fixed with respect to the case 109, and the connector body 111 will not come loose from the reception connector.

However, especially in cold climates etc., there are times when the electromagnetic solenoid 115 becomes inoperable due to freezing or damage. For example, when an abnormality occurs in the electromagnetic solenoid 115 during electric conduction, the power supply connector 100 cannot be pulled out from the connector of the power reception side, even after charging is completed. Thus, in order to release the locked state by the lock lever 107, the power supply connector 100 must be taken apart to remove the electromagnetic solenoid 115 and lock lever 107 etc. inside. However, such operation requires work man-hour.

Further, taking apart the interior of the power supply connector 100 to release the lock requires workspace. For example, normally, in a power reception connector for electric automobiles, an openable lid is provided. However, depending on the structure of the interior of the power supply connector 100, the openable lid may prohibit one from securing workspace. Thus, it may become difficult to unlock the lock lever 107.

The present invention was made in view of such problems, and its object is to provide a power supply connector, wherein the lock mechanism can easily be released during emergencies.

In order to achieve the above-described object, the first invention is a power supply connector for electric automobiles, which comprises: a connector body; a case for accommodating the connector body; a grasping member that is attached to the case; a lock lever that limits the movement of the case with respect to the grasping member; a link member that is linked to the lock lever; and an electromagnetic solenoid that is fixed to the grasping member; wherein a plunger of the electromagnetic solenoid is connected to the link member, and when the lock lever is in a released state, the connector body and the grasping member are slidable in a direction of nearly the same axis line with respect to the case, and by sliding the grasping member with respect to the case and operating the electromagnetic solenoid while the lock lever is locked to the case, a state in which the lock lever is locked to the case by the link member is maintained, and further, a cover is provided on the grasping member, and a pin that penetrates the lock lever can be extracted by opening the cover.

It is preferable that the pin that penetrates the lock lever can be extracted from either direction of the two sides of the grasping member. It is preferable that retaining plates for the pin are provided on both sides of the pin. The retaining plates may be integrally formed on the inside of the cover. The cover is fixed on the grasping member by a fixing member, and release of the fixing of the cover by the fixing member and removal of the cover may be performable from the rear side of the grasping member.

According to the first invention, a pin, which is provided on the link member that links the lock lever and the electromagnetic solenoid, can be extracted from both sides of the power supply connector. Thus, the pin can be extracted from the side with enough work space, even with the openable lid on either side. Thus, in case of an abnormality in the electromagnetic solenoid, the pin can be extracted with certainty and unlocked. For this reason, the power supply connector can be pulled out from the power reception connector. Further, since the cover is provided on the grasping member, the work efficiency for extracting the pin becomes better.

Further, in the present invention, in order to allow the pin to be extracted from both sides, the pin cannot be formed with a retaining mechanism such as a head (flange part). To solve this problem, by arranging retaining plates on both sides of the pin, the pin can be prevented from falling off while in use.

In such as case, if the retaining plates are formed integrally with the cover, the retaining plates are removed with the cover when the cover is opened, and thus, the pin can be extracted easily.

The second invention is a method for unlocking a power supply connector for automobiles, wherein the power supply connector comprises: a connector body; a case for accommodating the connector body; a grasping member that is attached to the case; a lock lever that limits the movement of the case with respect to the grasping member; a link member that is linked to the lock lever; and an electromagnetic solenoid that is fixed to the grasping member; wherein a plunger of the electromagnetic solenoid is connected to the link member, and when the lock lever is in a released state, the connector body and the grasping member are slidable in a direction of nearly the same axis line with respect to the case; and the method comprises: to a state in which the lock lever is locked to the case by the link member by sliding the grasping member with respect to the case and operating the electromagnetic solenoid while the lock lever is locked to the case, opening a cover provided on the grasping member; and extracting a pin that penetrates the link member.

According to the second invention, a pin, which is provided on the link member that links the lock lever and the electromagnetic solenoid, can be extracted from both sides of the power supply connector. Thus, the pin can be extracted from the side with enough work space, even with the openable lid on either side. Thus, in case of an abnormality in the electromagnetic solenoid, the pin can be extracted with certainty and unlocked. For this reason, the power supply connector can be pulled out from the power reception connector. Further, since the cover is provided on the grasping member, the work efficiency for extracting the pin becomes better.

The present invention was made in view of the above-described problems and provides a power supply connector, wherein the lock mechanism can easily be released at emergencies.

BRIEF DESCRIPTION OF DRAWINGS

FIG. 13(a) is a figure that shows the process of removing the cover 3a.

FIG. 13(b) is a figure that shows the process of removing the cover 3a.

FIG. 14(a) is a figure that shows a state in which retaining plates 25a are provided on the cover 3a.

DESCRIPTION OF SOME EMBODIMENTS

Figure 1A:
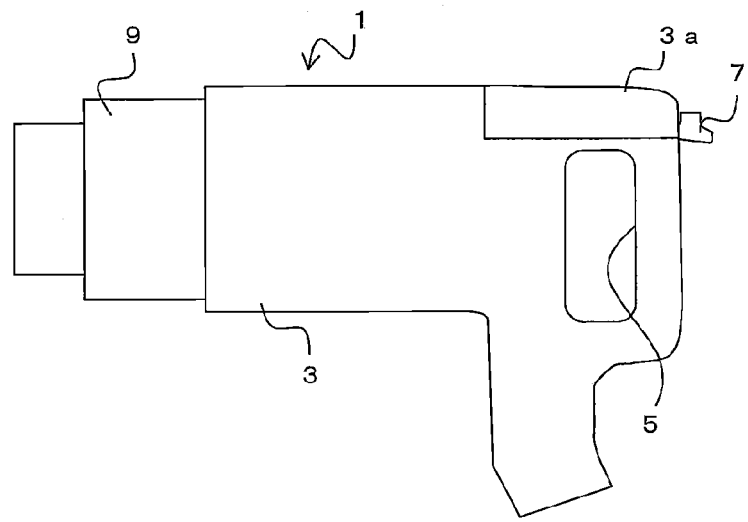
FIG. 1(a) is a side view of the power supply connector 1.
Figure 1B:
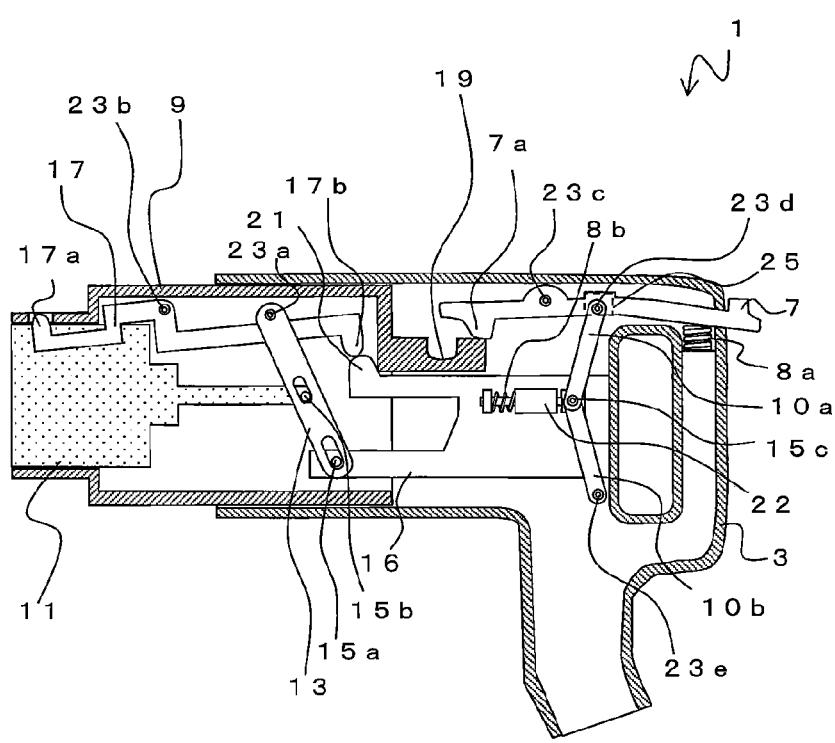
FIG. 1(b) is a sectional side view of the power supply connector 1.

Hereinafter, embodiments of the present invention will be described with reference to the accompanying figures. FIGS. 1(a) and (b) are schematic diagrams that indicate the power supply connector 1, and FIG. 1(a) is a side view, and FIG. 1(b) is a sectional side view. Note that in the present invention, the state shown in FIGS. 1(a) and (b) are referred to as the normal state. Further, in the following figures, cables and such are abbreviated from the figure. The power supply connector 1 mainly comprises a grasping member 3, a case 9 and a connector body 11.

As shown in FIG. 1(a) and FIG. 1(b), the grasping member 3 comprises a handle 5 on one end (rear). The handle 5 is the part that is held by the operator when handling the power supply connector 1. Here, the handle 5 is formed so that at least part of the handle 5 is positioned on a line that extends from the central axis of the connector body 11. For this reason, when the grasping member 3 is pushed in, force can be added to the connector body 11 in a straight direction against the object it is to be connected to. Thus, the power supply connector 1 is highly operatable.

The interior of the grasping member 3 can accommodate various structures. A case 9 is provided on the other end (front) of the grasping member 3. The vicinity of the front end of the grasping member 3 is cylindrical, and part (rear part) of the case 9 is accommodated inside the grasping member 3. The grasping member 3 can slide back and forth with respect to the case 9.

The case 9 is a cylindrical member and the connector body 11 is accommodated in the front end of the case 9. The connector body 11 can slide back and forth with respect to the case 9. Note that guide mechanisms and stoppers that regulate the slidable area, which are abbreviated from the figure, may be provided in each slidable part of the grasping member 3 and the connector body 11, with respect to the case 9.

Inside the case 9 is provided an arm 13. The vicinity of one end of the arm 13 is rotatably attached to the case 9 with a pin 23a. The vicinity of the other end of the arm 13 is connected to a connection bar 16, which is joined to the grasping member 3, by a linkage 15a. At the linkage 15a, both parts are rotatably connected by an elongated hole formed on the arm 13 and a pin etc. formed on the connection bar 16.

The arm 13 is connected to the connector body 11 by a linkage 15b approximately at the center (between pin 23a and linkage 15a) of the arm 13. The composition of linkage 15b is similar to that of linkage 15a. That is, when the arm 13 rotates, the connector body 11 and the grasping member 3 are movable on a straight line with respect to the case 9, along with the rotation of the arm 13.

In the case 9 is provided a locking member 17. The locking member 17 is rotatably attached to the case 9 by a pin 23b. A lock pin 17a is formed in an upward direction at the front end of the locking member 17. The lock pin 17a is arranged at the position of an opening formed on the case 9.

At the rear end of the locking member 17 is provided a joint 17b in a downward direction. Joint 17b is of a convexed shape that can fit joint 21. The joint 21 is fixed on the grasping member 3 side. In a normal state, the joints 17b and 21 do not fit and the protrusion of joint 17b is positioned on top of the protrusion of joint 21. Further, in this state, because joint 17b is pushed upward by joint 21, the lock pin 17a does not protrude from the case 9 (the opening formed on the case 9) via pin 23b and remains within the case 9.

A lock lever 7, which is the operation part, is provided within the grasping member 3. The lock lever 7 is rotatably attached to the grasping member 3 by a pin 23c. The rear side end of the lock lever 7 protrudes out from the grasping member 3, allowing the operator to operate the lock lever 7 from the outside. A lock pin 7a is provided at the front of the lock lever 7 in a downward direction. The lock pin 7a comes in contact with part of the case 9, and is normally in a state of being pushed up. On the case 9 at the front side of the part that comes in contact with the lock pin 7a in a normal state, a concaved part 19, which the lock pin 7a can fit into, is provided.

Further, a spring 8a is provided in the vicinity of the rear end side of the lock lever 7. The spring 8a pushes up the vicinity of the rear end of the lock lever 7. That is, the lock pin 7a is pressed downward by the pin 23c as the fulcrum point.

Figure 2:
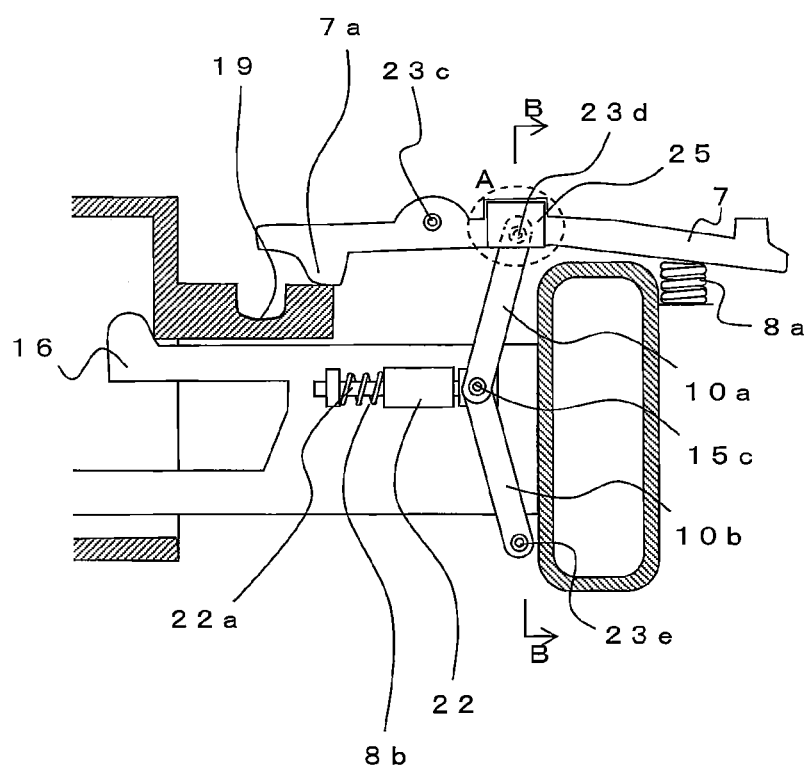
FIG. 2 is an enlarged view of the vicinity of the lock lever 7 of the power supply connector 1.
Figure 3:
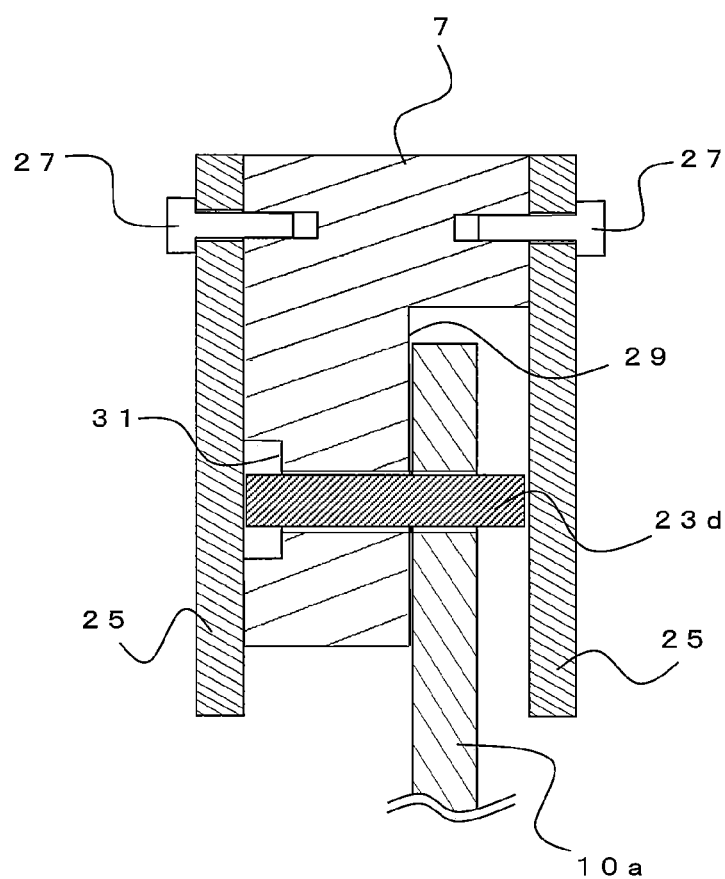
FIG. 3 is a sectional view of line B-B in part A of FIG. 2.

An electromagnetic solenoid 22 is connected to the lock lever 7 via link members 10a, and 10b. FIG. 2 is an enlarged view of the vicinity of the lock lever 7, and FIG. 3 is a cross sectional view at the B-B line in the A part of FIG. 2. At a position of the lock lever 7 further behind the pin 23c, one end of the link member 10a is rotatably connected with pin 23d.

As shown in FIG. 3, the pin 23d is a rod-like member that is formed with a substantially equal diameter throughout, with neither end parts having expanded diameters. Thus, the pin 23d, which penetrates the lock lever 7 and the link member 10a, has no retaining mechanism formed on itself. Therefore, retaining plates 25 are fixed by screws 27 on both sides of the lock lever 7 to prevent the pin 23d from falling off.

Note that concaved parts 29, 31 are formed on the lock lever 7 in the vicinity of the part where the pin 23d penetrates. The length of the pin 23d is slightly shorter than the distance between the retaining plates 25 (the width of the lock lever 7 in the figure). Further, the length of the pin 23d and the depth of the concaved parts 29, 31 are set, taking in consideration the thickness of the link member 10a, so that when the retaining plates 25 are removed, given lengths of the end parts of the pin 23d are exposed on either side.

As shown in FIG. 2, the other end of the link member 10a is rotatably connected to one end of the link member 10b by a linkage 15c. Further, the other end of link member 10b is rotatably connected to the grasping member 3 by a pin 23e. Note that in a normal state, link members 10a and 10b are arranged at an angle from each other so that they are bent forward at the linkage 15c.

The electromagnetic solenoid 22 is fixed to the grasping member 3 in the vicinity of the linkage 15c. A plunger 22a penetrates the interior of the electromagnetic solenoid 22, and the plunger 22a can be operated by operating the electromagnetic solenoid 22. The end of the plunger 22a is connected to the linkage 15c. The plunger 22a is connected toward the rear side from the bent part (front) of the link members 10a and 10b in a normal state.

A spring 8b is provided on the electromagnetic solenoid 22. The spring 8b applies force to the plunger 22a in a direction that retracts the plunger 22a. Thus, in a normal state, the plunger 22a is pulled toward the front side (left side in the figure) by the spring 8b, which also causes the linkage 15c to be pulled toward the front. The link members 10a and 10b receive force in a direction that decreases their angle by the linkage 15c being pulled forward. Here, because the pin 23e is fixed to the grasping member 3, the pin 23d goes in a state of being pulled downward.

Figure 4:
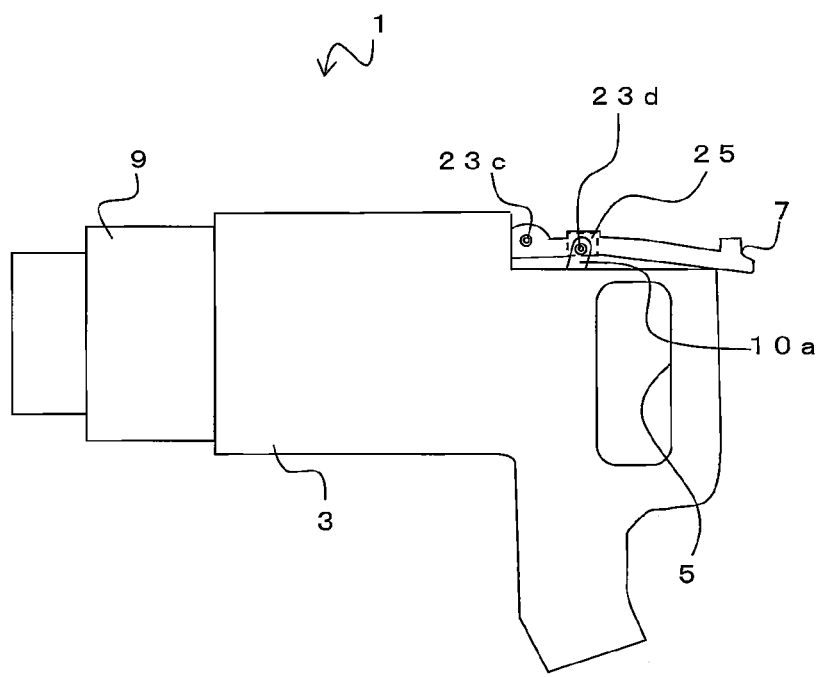
FIG. 4 is a side view that shows the power supply connector 1 in a state in which the cover 3a is open.

Further, as shown in FIGS. 1(a) and (b), at the part where the lock lever 7 of the grasping member 3 is arranged, a removable cover 3a is provided. The cover 3a is fixed with a bolt etc. from the rear (the right side in the figure) with respect to the body of the grasping member 3. FIG. 4 is a side view that shows a state in which the cover 3a is open. By opening the cover 3a, the vicinity of the linkage of the lock lever 7 and the link member 10a is exposed to the outside. More specifically, the retaining plates 25 can be exposed.

Figure 5A:
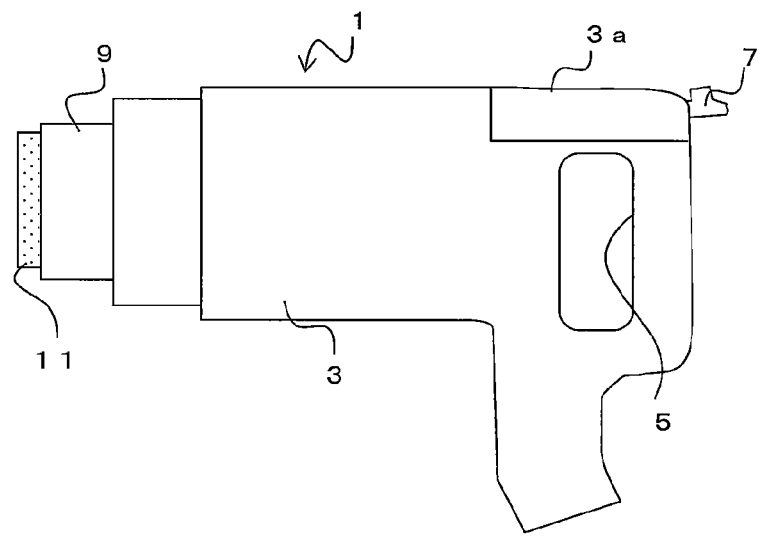
FIG. 5(a) is a side view of the power supply connector 1 in a state of operation.
Figure 5B:
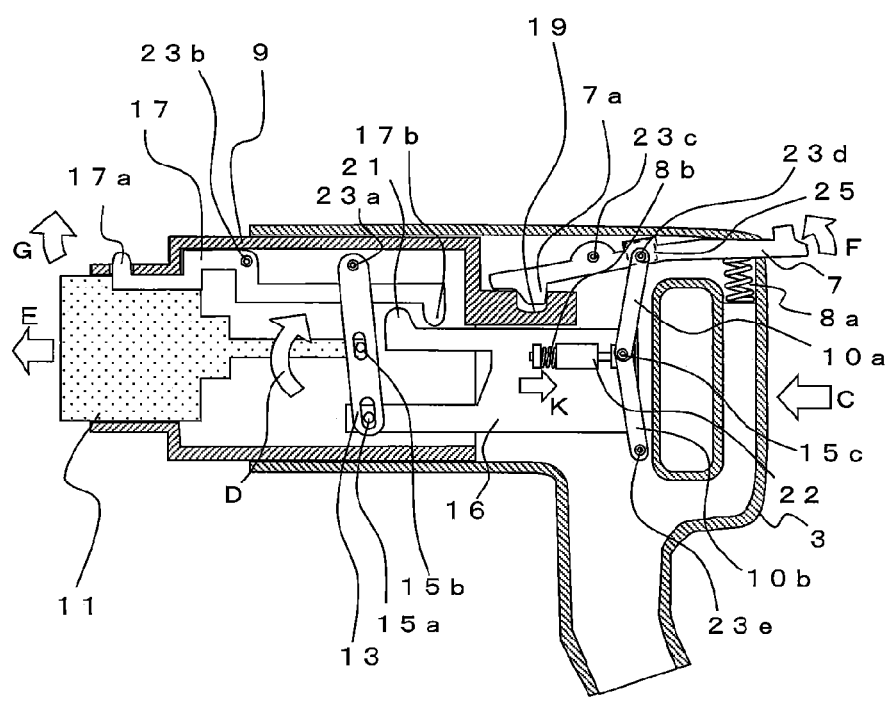
FIG. 5(b) is a sectional side view of the power supply connector 1 in a state of operation.

Next, a state in which the power supply connector 1 is operated will be described. FIGS. 5(a) and (b) are figures that show the power supply connector 1 in a state where the grasping member 3 is moved, and FIG. 5(a) is a side view, and FIG. 5(b) is a sectional side view. As shown in FIG. 5(b), when the grasping member 3 is moved forward with respect to the case 9 (in the direction of arrow C in the figure), the linkage 15a, which is jointed to the grasping member 3 (connection bar 16), is pushed in toward the front. Because the linkage 15a moves forward, the arm 13 rotates (in the direction of arrow D in the figure) with the pin 23a as its axis of rotation. The connector body 11, which is connected to the arm 13 by the linkage 15b, moves toward the same direction as the grasping member 3 (in the direction of arrow E in the figure), due to the rotation of the arm 13.

Note that the distance of movement for the grasping member 3 and the distance of movement for the connector body 11 with respect to the case 9 differ, because the linking positions to the arm 13 differ for the grasping member 3 and the connector body 11. Specifically, when the ratio of the distance of the linkages 15a and 15b from the pin 23a is 2:1, then if the distance of movement of the grasping member 3 with respect to the case 9 is set as 2, the distance of movement of the connector body 11 becomes 1. That is, the mechanism of the arm 13 etc., functions as a deceleration mechanism. By having a deceleration mechanism, the insertion-extraction process of the connector can be performed with little force.

Further, because the grasping member 3 moves forward with respect to the case 9, joint 17b and joint 21 join together to fit. Hence, the locking member 17 rotates with the pin 23b acting as its axis of rotation. That is, the locking member 17 rotates because the joint 17b side is pushed downward, and the lock pin 17a on the other end is pushed upward. Thus, the lock pin 17a protrudes outward (in the direction of arrow G in the figure) from the case 9 through the opening. Note that the locking member 17 may be formed with a spring etc., so that it constantly tries to return to the state shown in FIG. 5(b) (a state wherein the joint 17b is pushed down).

Further, because the grasping member 3 moves forward with respect to the case 9, the lock pin 7a of the lock lever 7 moves toward the concaved part 19. At this moment, the vicinity of the rear end of the lock lever 7 is pushed upward by the spring 8a (in the direction of arrow F in the figure). Thus, the lock lever 7 rotates with the pin 23c acting as its axis of rotation. Hence, the lock pin 7a fits into the concaved part 19.

Note that a detection means for detecting the position of the lock pin 7a may be provided in the vicinity of the concaved part 19 of the case 9. By doing so, the fitting of the lock pin 7a to the concaved part 19 can be detected with certainty.

Figure 6:
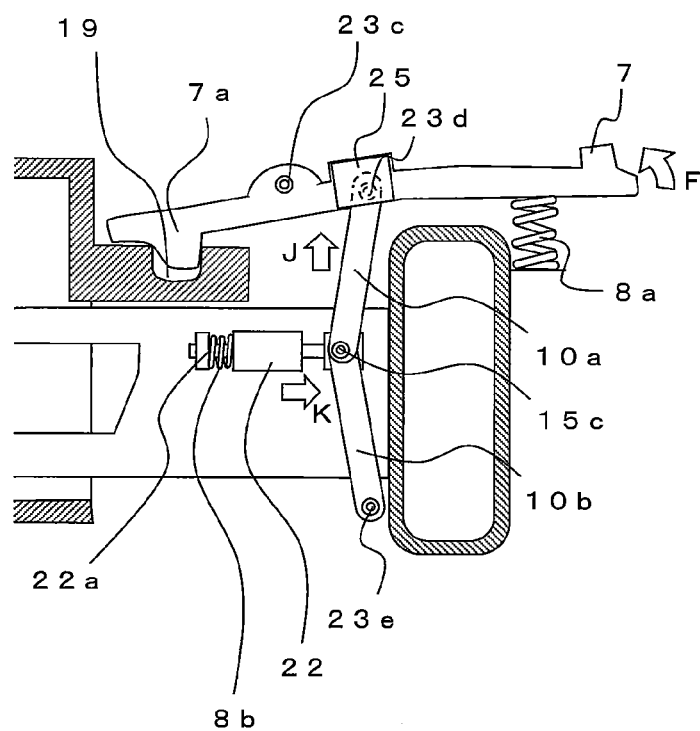
FIG. 6 is an enlarged view of the vicinity of the lock lever 7 of the power supply connector 1 in a state of operation.

When the lock lever 7 operates, force is conveyed to the electromagnetic solenoid 22 via link members 10a and 10b. FIG. 6 is an enlarged view of the vicinity of the lock lever 7. As described previously, the link member 10a is connected to the lock lever 7 by a pin 23d. Thus, by the upward movement of the lock lever 7, the link member 10a is pulled upward (in the direction of arrow J in the figure).

Here, the bottom end of the link member 10b is fixed to the grasping member 3 by the pin 23e. Thus, link members 10a and 10b move in the direction that increases their angle, along with the movement of the lock lever 7. Thus, the linkage 15c moves toward the rear.

In this case, the plunger 22a connected to the linkage 15c moves toward the rear side (in the direction that protrudes from the electromagnetic solenoid 22 body,) (in the direction of arrow K in the figure) in opposition to the restoration force of the spring 8b. Thus, when the plunger 22a is unable to move with respect to the body of the electromagnetic solenoid 22 due to freezing etc., the linkage 15c cannot move. Hence, in such a case, the lock lever 7 cannot rotate around the pin 23c, and the state of FIGS. 5(a) and (b), wherein the lock pin 7a fits into the concaved part 19, cannot be obtained. Therefore, the operator can understand whether or not the plunger 22a is in a movable state.

If the plunger 22a is in a movable state, the lock pin 7a fits into the concaved part 19 by operation of the lock lever 7. Thus, the movement of the grasping member 3 with respect to the case 9 is locked. That is, the lock lever 7 functions as a locking means that locks the grasping member 3 (and the connector body 11) from moving with respect to the case 9. Further, it functions as a release mechanism for releasing the same lock by operating the lock lever 7 (pressing down the outside end of the lock lever 7). Thus, the connected state of the connector can be maintained with certainty, while further allowing easy release.

Note that a parallel link may be used as the sliding part of the grasping member 3 (or the connector body 11) and the case 9. By using a parallel link, rattling of the grasping member 3 (or the connector body 11) and the case 9 during sliding is less likely to occur, and the moving range can be regulated.

Figure 7:
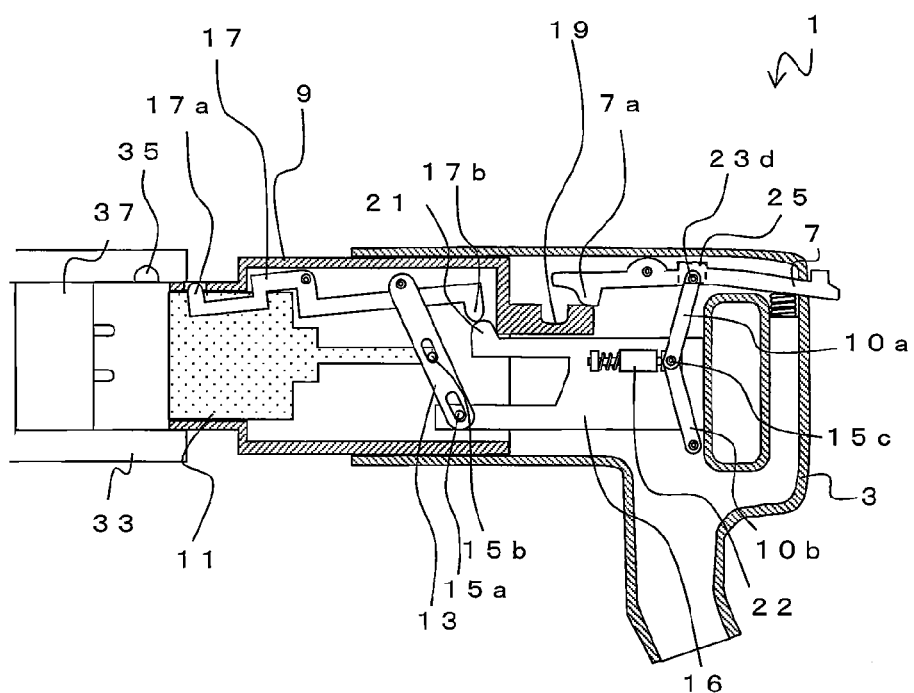
FIG. 7 is a sectional side view that shows a state in which the power supply connector 1 is about to be connected to the power reception connector 33.

Next, the method of utilizing the power supply connector 1 will be described. FIG. 7 to FIG. 10 are figures that show the process of connecting the power supply connector 1 to the power reception connector 33. First, as shown in FIG. 7, the power supply connector 1 in a normal state is faced toward the power reception connector 33, which is the object of connection. Specifically, the tip of the case 9 is inserted into the power reception connector side. Note that a connector body 37 is accommodated within the power reception connector 33. In this state, the male-female terminals of the connector bodies 11 and 37 are arranged with a slight gap and are not in a state of connection.

A concaved part 35, which is the locking part, is formed on the inner surface of the power reception connector 33 side, at a position corresponding to the lock pin 17a in a state in which the case 9 is arranged at the power reception connector side 33. A guide etc. for positioning with the power reception connector 33 side may be formed on the outer surface of the case 9, in order to align the lock pin 17a with the concaved part 35a or to align the positions of the male-female terminals.

Figure 8:
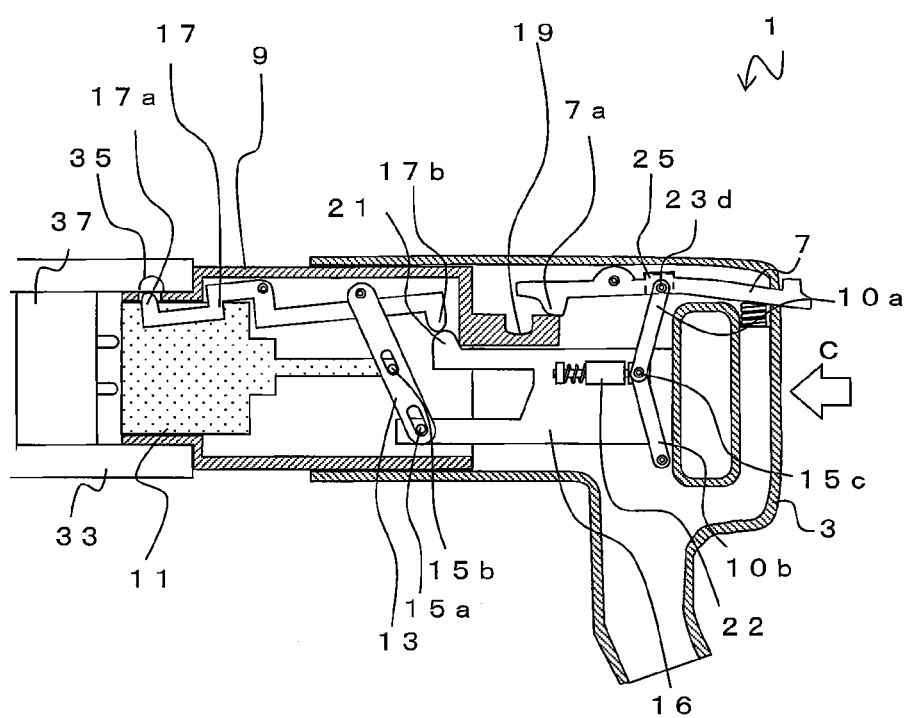
FIG. 8 is a sectional side view that shows a state in which the power supply connector 1 is about to be connected to the power reception connector 33.

Next, as shown in FIG. 8, because the level difference of the case 9 touches the rim (wall part at the front of the concaved part 35) of the power reception connector 33 when the grasping member 3 of the power supply connector 1 is pushed toward the power reception connector 33 side (in the direction of arrow C in the figure), it cannot be pushed in any further. Thus, the connection bar 16 moves forward (in the direction of arrow C in the figure).

Figure 9:
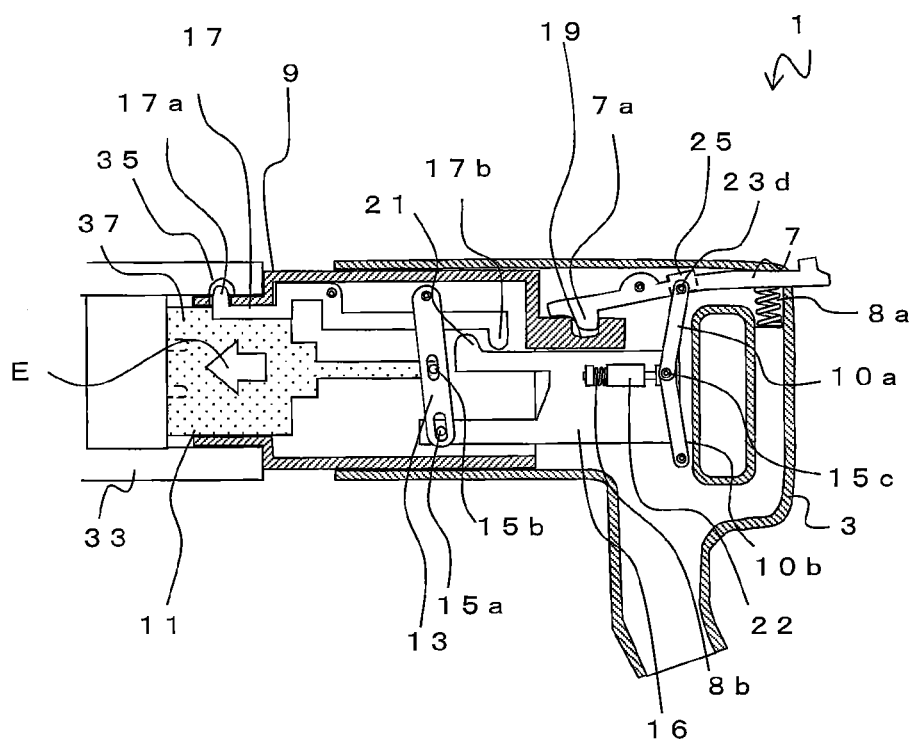
FIG. 9 is a sectional side view that shows a state in which the power supply connector 1 is connected to the power reception connector 33.

For this reason, as shown in FIG. 9, the grasping member 3 can be moved forward with respect to the case 9. At this point, the connector body 11 moves forward with respect to the case 9 (in the direction of arrow E in the figure) along with the movement of the grasping member 3. Thus, the connector body 11 protrudes from the front of the case 9 and connects with the connector body 37 of the power reception connector side.

Here, when the ratio of the movement distance of the grasping member 3 and the connector body 11 with respect to the case 9 is 2:1, by pushing the grasping member 3 in a movement distance that is twice the spare length of connection, which connects the connector body 11 and the connector body 37, the connector body 11 can be moved just enough to allow the connectors to connect. That is, the connectors can be connected by pushing in the grasping member 3 with half the force necessary for connecting the two connectors (i.e., the interconnection resistance). Note that the deceleration ratio of the deceleration mechanism can be set arbitrarily, taking into consideration the interconnection resistance and operability.

Further, as described previously, in the state shown in FIG. 9, the lock pin 17a fits into the concaved part 35. For this reason, the power reception connector 33 and the power supply connector 1 are locked in a connected state. Further, in such a state, the lock pin 7a at the end of the lock lever 7 fits into the concaved part 19. For this reason, the movement of the grasping member 3 with respect to the case 9 is locked. Thus, even when the cable etc., which is abbreviated in the figure, is pulled, the power supply connector 1 is not easily disconnected from the power reception connector 33.

When the lock pin 7a fits into the concaved part 19, the connected connectors become electrically conductible.

Figure 10:
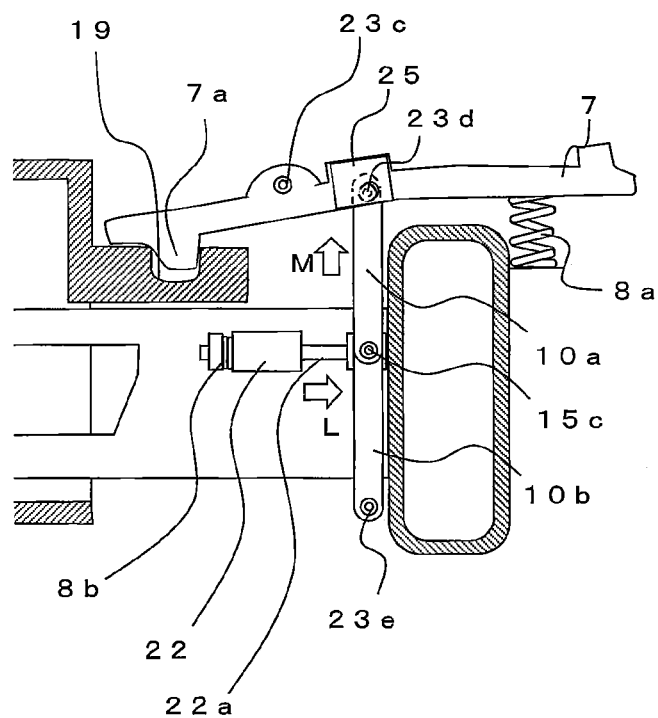
FIG. 10 is an enlarged view of the vicinity of the lock lever 7 in a state in which the electromagnetic solenoid 22 is operated.

When electric conduction of the connectors begins, as shown in FIG. 10, the electromagnetic solenoid 22 operates. The electromagnetic solenoid 22 constantly pushes the plunger 22a toward the linkage 15c in opposition to the spring 8b (in the direction of arrow L in the figure) during electric conduction. The link members 10a and 10b move apart in an opening direction by the movement of the plunger 22a. Thus, the top end part (pin 23d) of the link member 10a is pushed upward (in the direction of arrow M in the figure). Hence, it becomes impossible to release the lock lever 7 during electric conduction. For this reason, the operator cannot release the lock of the lock lever 7 during electric conduction, and the connection of the connectors cannot be pulled out during electric conduction.

Note that when disconnecting the power supply connector 1, by stopping electric conduction, the operation of the electromagnetic solenoid 22 stops. When the electromagnetic solenoid 22 stops, the plunger 22a is pulled back toward the front by the spring 8b. By pressing down the end of the lock lever 7 in this state, the lock pin 7a can be pushed up. By pulling back the grasping member 3 after the lock pin 7a is released from the concaved part 19, the joint 17b moves to the top of joint 21, which leads the lock by the lock pin 17a to be released. Thus, the power supply connector 1 can easily be disconnected.

Here, there are times when the electromagnetic solenoid 22 malfunctions during electric conduction. For example, there are times when the electromagnetic solenoid 22 does not operate due to freezing or damage. As described previously, when the electromagnetic solenoid 22 malfunctions before the power supply connector 1 is used, the lock lever 7 does not operate to begin with. On the other hand, when the electromagnetic solenoid 22 malfunctions once electric conduct is initiated, unlocking becomes impossible, because the lock lever 7 becomes inoperable in a locked state. Thus, even after terminating electric conduct, the power supply connector 1 cannot be pulled out from the power reception connector 33. In such a case, it must be unlocked mechanic ally.

Figure 11A:
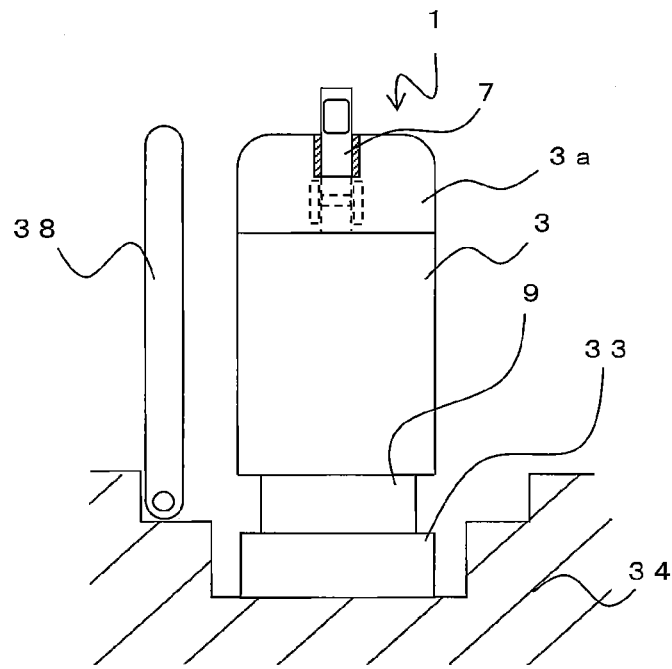
FIG. 11(a) is a top view of a state in which the pin 23d is extracted from one side.

FIG. 11(a) is a top view that shows a state in which the power supply connector 1 is connected to a power reception connector 33 of the car body 34. The power reception connector 33 formed on the car body 34 is normally protected by a lid 38. By opening the lid 38, the interior of the power reception connector 33 is exposed and the power supply connector 1 can be connected. In the example shown in the figure, when the power supply connector 1 is in a state of connection, the lid 38 is arranged so that it opens to the left side of the power supply connector 1 in the figure.

Figure 11B:
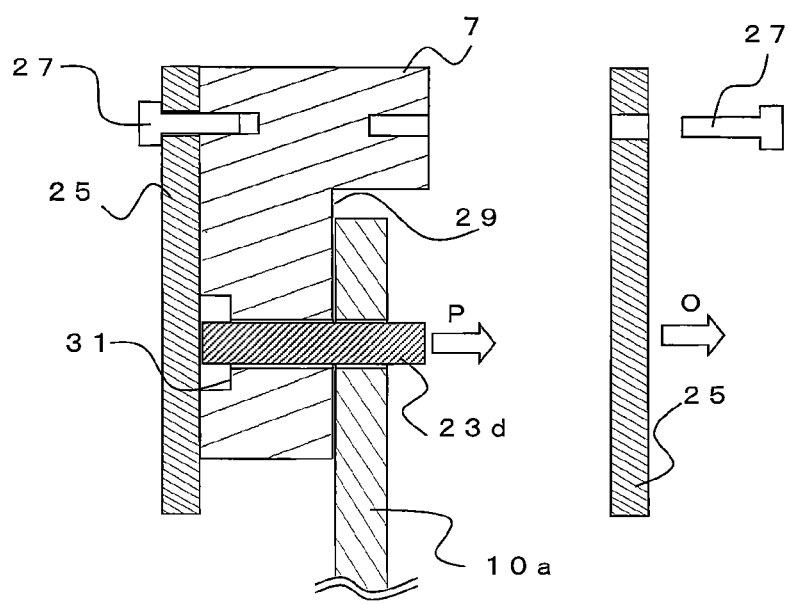
FIG. 11(b) is a figure that corresponds to FIG. 3.

In such a state, when the lock lever 7 becomes inoperable, first, the cover 3a is removed. By doing so, the vicinity of the linkage of the lock lever 7 and the link member 10a can be exposed. FIG. 11(b) is a figure that corresponds to FIG. 3.

As shown in FIG. 11(b), because the lid 38 exists at the left side in the figure, there is no workspace. Thus, in this case, the retaining plate 25 is removed from the right side to expose the vicinity of the end part of the pin 23d. In such as state, by extracting the pin 23d, the link between the lock lever 7 and the link member 10a can be undone. Thus, the lock lever 7 can be operated independent of the electromagnetic solenoid 22.

That is, the lock can be released and the power supply connector 1 can be pulled out from the power reception connector 33. Note that because a concaved part 29 is formed on the lock lever 7, the pin 23d can easily be extracted.

Figure 12A:
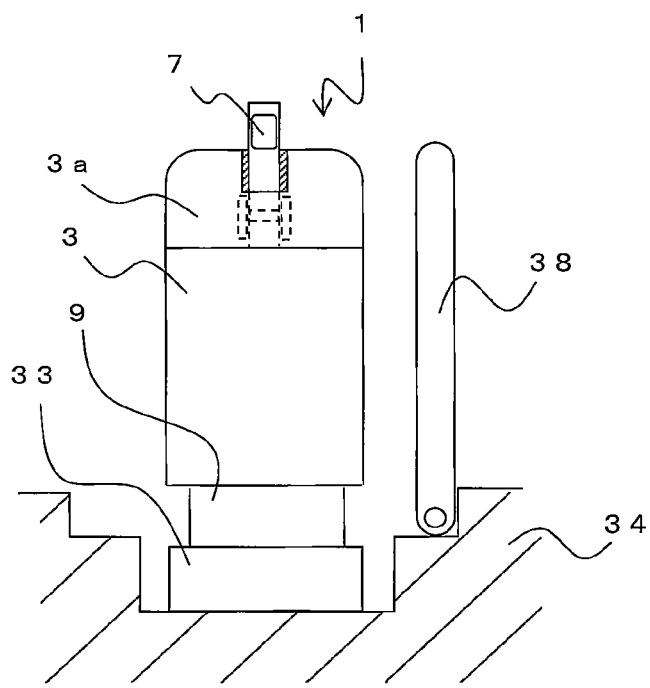
FIG. 12(a) is a top view of a state in which the pin 23d is extracted from the other side.
Figure 12B:
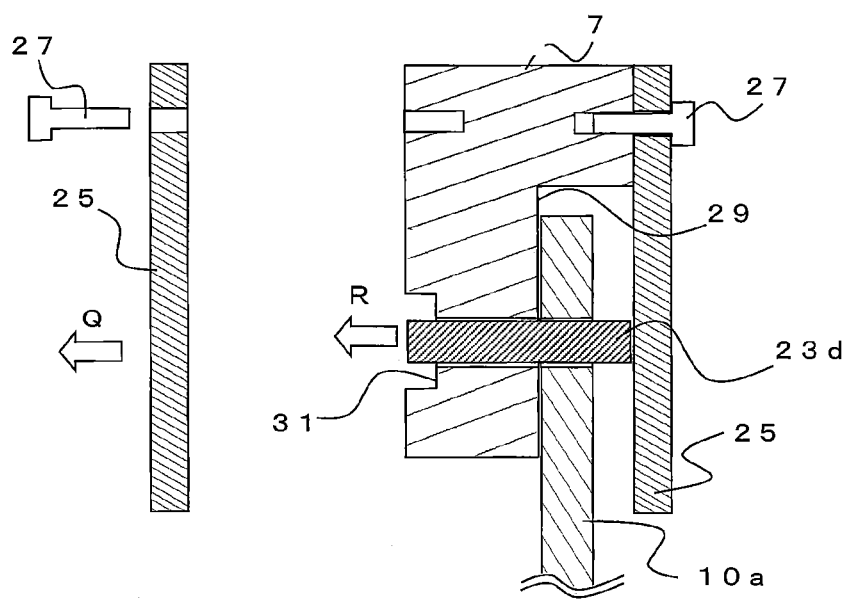
FIG. 12(b) is a figure that corresponds to FIG. 3.

Further, as shown in FIG. 12(a), depending on the car body 34, the lid 38 may be positioned on the right side of the power supply connector 1 in the figure. In such a case, as shown in FIG. 12(b), the retaining plate 25 can be removed from the left side to expose the vicinity of the end part of the pin 23d. By extracting the pin 23d in such a state, the link between the lock lever 7 and the link member 10a can be undone. Note that because a concaved part 31 is formed on the lock lever 7, the pin 23d can easily be extracted.

Figure 13A:
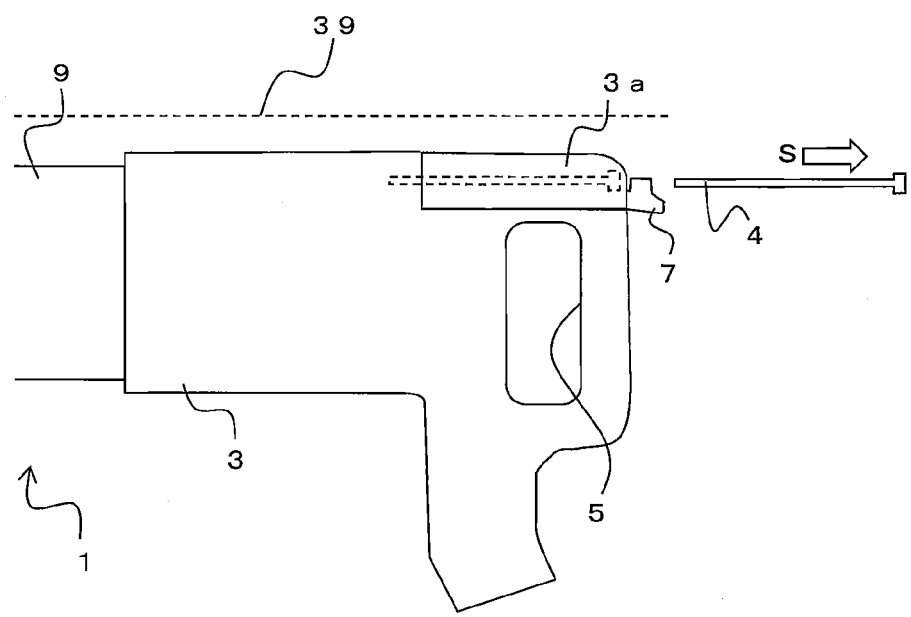

Note that in the present invention, even when there is no workspace at the upper side of the power supply connector 1, one can correspond to the malfunction of the electromagnetic solenoid 22. FIGS. 13(a) and (b) are figures that show a state in which the cover 3a is taken off. As shown in FIG. 13(a), even when the car body-side cover 39 etc. is positioned at the upper side of the power supply connector 1, because the bolt 4, which is the fixing member, is fastened to the grasping member 3 from the rear of the power supply connector 1, the bolt 4 can be extracted from the rear side of the power supply connector 1 (the grasping member 3). Thus, the bolt 4 and tools do not interfere with the car body-side cover 39.

Here, the rear side of the power supply connector 1 (the grasping member 3) refers to the side approximately opposite to the connection direction of the power supply connector 1 (left side of the figure), and is the direction that enables the process of extracting the bolt etc., even when an obstacle exists in the proximity of the upper part (or the bottom part, or both sides) of the power supply connector 1 (right side of the figure).

Figure 13B:
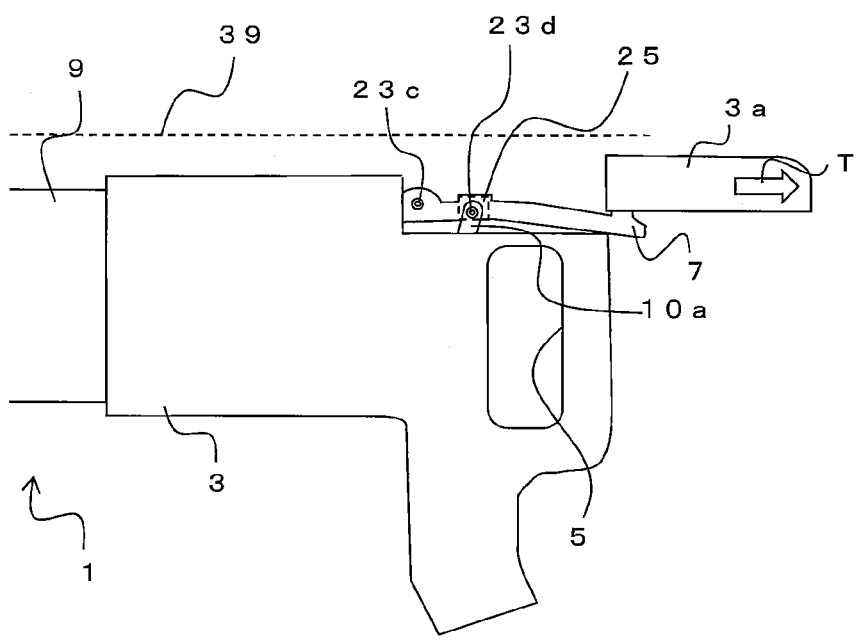

Next, as shown in FIG. 13(b), the cover 3a is taken off. The cover 3a can also be removed from the rear side of the power supply connector 1 (the grasping member 3). Thus, the cover 3a does not interfere with the car body-side cover 39. Note that the fixing member that fixes the cover 3a does not necessarily have to be a bolt 4, but may be any other fixing member as long as the fixing of the cover 3a can be released from the rear side of the power supply connector 1 (the grasping member 3).

As described above, by using the power supply connector 1 of the present embodiment, connection with the power reception connector 33 can be easily performed without the use of large force. In particular, because the pushing movement of the grasping member 3 by the operator matches the direction of connection of the connector body 11 in the power supply connector 1, the operator can easily understand the connection process instinctively.

Further, by providing a cover 3a as part of the grasping member 3, and opening the cover 3a, the linkage of the lock lever 7 and the link member 10a can be exposed. Thus, even when the electromagnetic solenoid 22 malfunctions, the pin 23d can easily be removed and the lock lever 7 can be unlocked urgently.

In such a case, the operation of removing the cover 3a and the tools do not interfere with the car body-side cover 39 etc., even when the car body-side cover 39 is in close proximity at the upper side of the power supply connector 1.

Further, because the pin 23d is rod-shaped and has no head part or flange at the end, it can be extracted from either side. Thus, the pin 23d can be extracted easily, regardless of the arrangement of the lid 38 of the car body. Further, by arranging retaining plates 25 on both side of the pin 23d, the pin 23d can be protected from falling off while in use.

Note that although the retaining plates 25 are fixed by screws 27 on the lock lever 7 in the present embodiment, the present invention is not limited to such. Structures other than the retaining plates 25 may be utilized, as long as the pin 23d can be extracted from both sides and is protected from falling off while in use.

Figure 14A:
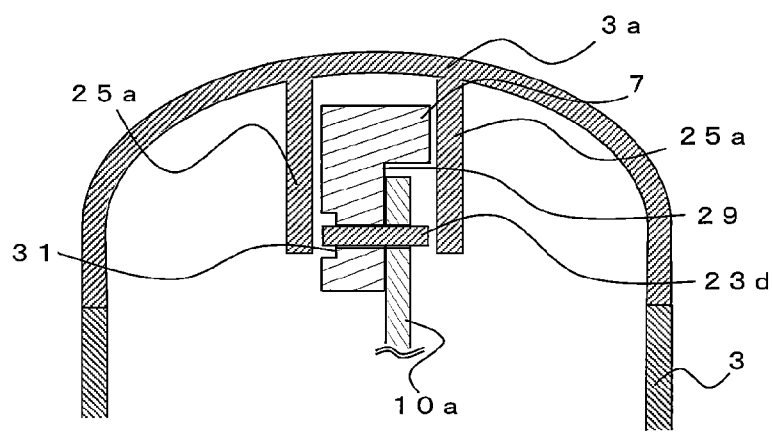
Figure 14B:
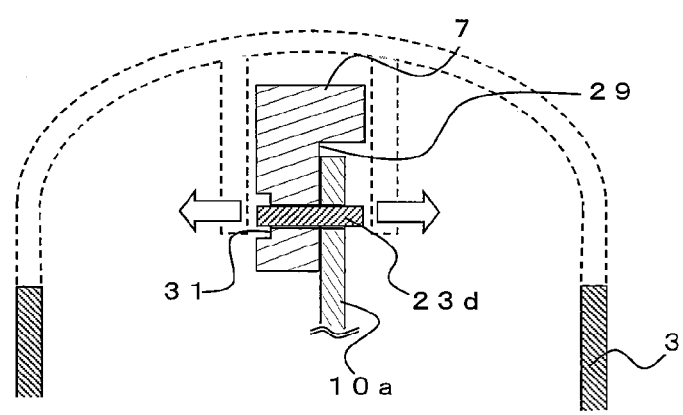
FIG. 14(b) is a figure that shows a state in which the cover 3a is removed.
Figure 15A:
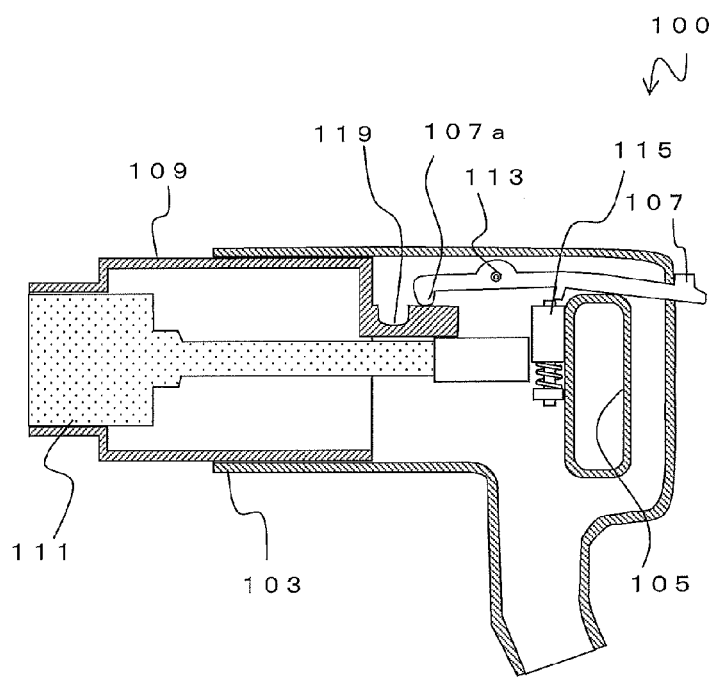
FIG. 15(a) is a figure that shows the movement of a conventional power supply connector 100.
Figure 15B:
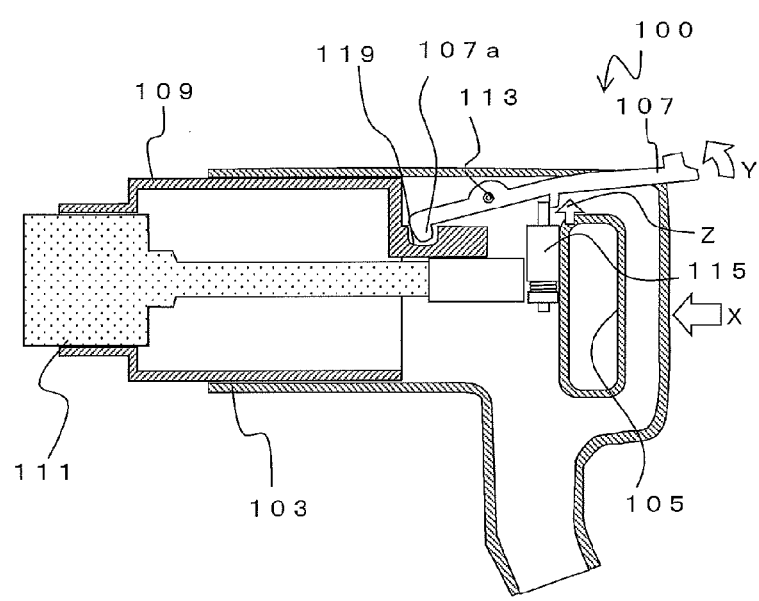
FIG. 15(b) is a figure that shows the movement of a conventional power supply connector 100.

FIG. 14(a) is a cross sectional view of the vicinity of the linkage of the lock lever 7 and the link member 10a, seen from the front. As shown in FIG. 14(a), the retaining plates 25a may be formed as ribs on the inner surface (bottom surface) of the cover 3a. In such a case, the cover 3a and the retaining plates 25a can be formed integrally. By doing so, as shown in FIG. 14(b), when the cover 3a is removed, the retaining plates 25a are removed at the same time, and thus, the process of taking off the retaining plates 25a becomes unnecessary. This enables the pin 23d to be extracted from either side.

Although embodiments of the present invention have been described in detail above with reference to the accompanying figures, the present invention is not influenced by such embodiments. It should be obvious to those in the field that examples of various changes and modifications are included within the realm of the technical idea of the present invention, and it should be understood that such examples are included in the technical scope of the present invention.

For example, in the aforementioned embodiment, although a case where the pin 23d at the linkage of the lock lever 7 and the link member 10a is extracted in order to unlock the lock lever 7 was described as an example, the pin that is to be extracted during emergencies may be any other pin, as long as it can release the lock of the lock lever 7 itself.

DESCRIPTION OF NOTATIONS 1 power supply connector
3 grasping member
3a cover
4 bolt
5 handle
7 lock lever
7a lock pin
8a, 8b spring
9 case
10a, 10b link member
11 connector body
13 arm
15a, 15b, 15c linkage
16 connection bar
17 locking member
17a lock pin
17b joint
19 concaved part
21 joint
22 electromagnetic solenoid
22a plunger
23a, 23b, 23c, 23d, 23e pin
25, 25a retaining plate(s)
27 screw
29, 31 concaved part
33 power reception connector
34 car body
35 concaved part
37 connector body
38 lid
39 car body-side cover
100 power supply connector
103 grasping member
105 handle
107 lock lever
107a lock pin
109 case
111 connector body
113 pin
115 electromagnetic solenoid
119 concaved part

The invention claimed is:

1. A power supply connector for electric automobiles, which comprises:
a connector body;
a case for accommodating the connector body;
a grasping member that is attached to the case;
a lock lever that limits the movement of the case with respect to the grasping member;
a link member that is linked to the lock lever; and
an electromagnetic solenoid that is fixed to the grasping member; wherein
a plunger of the electromagnetic solenoid is connected to the link member, and
when the lock lever is in a released state, the connector body and the grasping member are slidable in a direction of nearly the same axis line with respect to the case, and
by sliding the grasping member with respect to the case and operating the electromagnetic solenoid while the lock lever is locked to the case, a state in which the lock lever is locked to the case by the link member is maintained, and further,
a cover is provided on the grasping member, and a pin that penetrates the lock lever can be extracted by opening the cover.

2. The power supply connector according to claim 1, wherein the pin that penetrates the lock lever can be extracted from either direction of the two sides of the grasping member.

3. The power supply connector according to claim 2, wherein retaining plates for the pin are provided on both sides of the pin.

4. The power supply connector according to claim 3, wherein the retaining plates are integrally formed on the inside of the cover.

5. The power supply connector according to claim 1, wherein the cover is fixed on the grasping member by a fixing member, and
release of the fixing of the cover by the fixing member and removal of the cover can be performed from the rear side of the grasping member.

6. A method for unlocking a power supply connector for automobiles, wherein the power supply connector comprises:
a connector body;
a case for accommodating the connector body;
a grasping member that is attached to the case;
a lock lever that limits the movement of the case with respect to the grasping member:
a link member that is linked to the lock lever; and
an electromagnetic solenoid that is fixed to the grasping member; wherein
a plunger of the electromagnetic solenoid is connected to the link member, and
when the lock lever is in a released state, the connector body and the grasping member are slidable in a direction of nearly the same axis line with respect to the case; and
the method comprises,
to a state in which the lock lever is locked to the case by the link member by sliding the grasping member with respect to the case and operating the electromagnetic solenoid while the lock lever is locked to the case,
opening a cover provided on the grasping member; and
extracting a pin that penetrates the link member.

* * * * *